United States Patent [19]

Conforti

[11] Patent Number: 4,774,660
[45] Date of Patent: Sep. 27, 1988

[54] INCREASED BANDWIDTH FOR MULTI-PROCESSOR ACCESS OF A COMMON RESOURCE

[75] Inventor: Joseph A. Conforti, Phoenix, Ariz.

[73] Assignee: GTE Communication Systems Corporation, Phoenix, Ariz.

[21] Appl. No.: 17,383

[22] Filed: Feb. 20, 1987

[51] Int. Cl.⁴ .......................................... G06F 13/00
[52] U.S. Cl. ............................................... 364/200
[58] Field of Search ... 364/200 MS File, 900 MS File, 364/187; 371/9

[56] References Cited

U.S. PATENT DOCUMENTS

| | | | |
|---|---|---|---|
| 4,354,225 | 10/1982 | Frieder et al. | 364/200 |
| 4,394,728 | 7/1983 | Comfort et al. | 364/200 |
| 4,395,753 | 7/1983 | Comfort et al. | 364/200 |
| 4,486,834 | 12/1984 | Kobayashi et al. | 364/200 |

Primary Examiner—Eddie P. Chan
Attorney, Agent, or Firm—Frank J. Bogacz; Anthony Miologos

[57] ABSTRACT

This circuitry permits equal access to a shared resource by a number of central processing units (CPUs). In a multiple CPU arrangement, common resource contention problems arise, when several CPUs attempt to access the common resource. To resolve these contention problems, this circuitry is an improvement to arbitration ring circuitry. The circuitry of this invention permits each of the CPUs equal access to the common resource during situations in which each CPU is constantly generating requests (high bandwidth utilization) for access to the common resource. This invention is particularly useful for systems in which a large number of CPUs must have their local memory rapidly reloaded from a common memory source. Reloading procedures for large numbers of CPUs rquire up to an hour. By employing the present invention, these reloading times can be cut from one hour to approximately 5 minutes.

18 Claims, 1 Drawing Sheet

INCREASED BANDWIDTH FOR MULTI-PROCESSOR ACCESS OF A COMMON RESOURCE

CROSS REFERENCE TO RELATED APPLICATIONS

The present application is related to co-pending U.S. patent application Ser. Nos. 017,384 and 017,385, both having the same inventive entity and being assigned to the same assignee as the present application.

BACKGROUND OF THE INVENTION

The present invention pertains to multiple central processing unit (CPU) controlled real-time systems and more particularly to a scheme for increasing the bandwidth for each CPU of a multi-processor configuration for accessing a commonly shared resource.

Computerized control of telecommunication systems is known in the art. Modern telecommunication systems require vast amounts of processing power in order to provide the varied telecommunication functions commonly in use. Distributed processing or load sharing among CPUs is now common place in large real time systems. The telecommunications industry is no exception to this rule.

In a distributed processing system, CPUs exchange information via a common resource or memory. In this way, the system's tasks may be divided among the available CPUs. Such a system also avoids multiple CPUs initiating the same task by granting access to the common resource or memory to only one CPU at a particular time.

Therefore, when several CPUs attempt to access the common resource or memory, a selection arrangement must allow only one CPU to access the common resource or memory at a time. This hardware is termed contention resolution or arbitration circuitry. One such arbitration controller is shown in U.S. Pat. No. 4,394,728, for an invention entitled Allocation Controller Providing For Access of Multiple Common Resources By A Duplex Plurality Of Central Processing Units. This patent was issued on July 19, 1983, to the same assignee as that of the present application. U.S. Pat. No. 4,394,728, is hereby incorporated by reference. U.S. Pat. No. 4,395,753, issued on July 26, 1983, also teaches this arbitration scheme. This Patent is antitled Allocation Controller Providing For Access of Multiple Common Resources by a Plurality of Central Processing Units. This patent is also incorporated by reference.

The above mentioned Patents teach an arbitration circuit which alternately grants access to a common resource to a CPU within one of two subgroups. Each subgroup contains sixteen CPUs. The arbitration scheme employed in these Patents is to alternate granting request to the common resource between the two subgroups. In addition, arbitration within a subgroup of sixteen CPUs was handled on a rotational bases (i.e. CPU0 first; CPU1 second; . . . CPU15 then CPU0 again).

The operation of this arbitration scheme may best be understood by referenced FIG. 1. FIG. 1 depicts the arbitration scheme employed by the circuitry of the above mentioned U.S. patents. FIG. 1 shows two CPU subgroups, each subgroup including sixteen CPUs. The designation for CPU0 of subgroup 0 is repeated for explanation purposes. Assume that all CPUs of both subgroups are requesting access to the common resource. Assume further that CPU0 of subgroup 0 is the first to be allocated access to the common resource, the arbitration circuitry then gives control to subgroup 1, but advances the CPU indicator to the next CPU within the group. As a result, CPU1 in subgroup 1 is allocated access to the common resource next. This is indicated by the arrow from CPU0, subgroup 0 to CPU 1, subgroup 1. Next, since this arbitration circuitry advances the CPU count and allocates access to the other group of CPUs. CPU2 in subgroup 0 is the next CPU to be allocated control to common resource (this is indicated by the arrow from CPU1, subgroup 1 to CPU2, subgroup 0). CPU3 in subgroup 1 is the next CPU to be allocated access to the common resource.

As can be seen from FIG. 1, every other CPU in each subgroup is not granted access to the common resource. This is due to the grant of access "walking" in between CPU subgroups, but always being advanced. This configuration was designed to handle telecommunication events which typically occur at the rate of 10 milliseconds per event. In situations where there is CPU contention for the common resource (i.e. many CPUs simultaneously requesting) and when events occur on an average of approximately 10 millisecond intervals typically true CPU contention, the CPU contentions are easily resolved within this time frame, since the available bandwidth is 666 nsec. This arbitration logic was designed in this fashion and worked well to allow up to 96 duplex processors access to the common resource for telecommunication functions which occurred at approximately 10 millisecond rate.

Public policy requires telecommunication functions including telephone service to operate 24 hours a day continuously without a disruption of service. Therefore, highly reliable telecommunication systems are required. In the above mentioned Patents, each CPU or processor has associated with it local memory. This local memory contains the operating instructions for each CPU. If this local memory becomes mutilated, the processors may not operate efficiently, if at all.

For a telecommunication system outage, no telephone services are provided. Such conditions must be quickly rectified. During outages in the system which employs the above mentioned Patents, reloading the local memory of a CPU from the common memory requires approximately 1 hour. This means that those telecommunication functions and telephone subscribers served by this processor are potentially without service for up to 1 hour.

Improvements were made to the system software which loaded processors whose local memory had become mutilated. This system software is able to reload a processor's local memory very quickly by constantly generating requests for access to the common resource with a frequency of request of approximately 1 request per 666 nanoseconds. As a result, the "walking" phenomenon referred to above in FIG. 1 was observed. That is, certain CPUs were quickly loaded while others were virtually completely ignored for access to the common resource.

For the duration of the reloading process, each CPU of each subgroup was constantly generating a request for access to the common resource. Due to the alternating rotational scheme employed by the arbitration circuitry of the above mentioned Patents, the CPU access bandwidth (frequency of access through the arbitration logic) was found to be insufficient to accommodate the 666 nanosecond bandwidth of 32 constantly requesting CPUs.

A fully equipped group of CPUs along with associated arbitration circuitry includes up to 17 printed wiring cards (PWCs). Since there are two copies of each CPU and arbitration circuit operating in duplex, a fully equipped CPU group (2 subgroups) included up to 34 PWCs. Each CPU group includes two subgroups (subgroup 0 and subgroup 1) as mentioned above. A fully equipped telecommunication system may include up to three processor groups. As a result, up to 96 duplex processors may be generating requests for access to the common resource.

Originally, it was believed that a complete redesign of the arbitration circuitry would be required to accommodate this fast reloading procedure. In addition, it was believed that each of the printed wiring cards would require redesign and relayout. The redesign and relayout functions are extremely costly and require considerable amounts of engineering time and effort.

It, therefore, is an object of the present invention to allow constant access to a common resource by a large number of CPUs, thereby increasing the bandwidth of the CPU/common resource interface, while requiring minimal circuit and engineering changes to the circuitry shown in the above mentioned Patents.

SUMMARY OF THE INVENTION

In accomplishing the object of the present invention, there is provided a novel arbitration scheme embodying minimal changes to a previously designed arbitration circuit for rapid local memory reloading by a number of CPUs.

In an allocation controller arrangement, the allocation controller provides for sharing access to multiple duplicate copy resources by a number of CPUs. The CPUs are grouped into three groups, each group having first and second portions. There are at least three duplicate copy resources. Each resource is connectable to any CPU.

The allocation controller also has first level arbitration circuits in three groups corresponding to the three groups of CPUs. The first level arbitration circuits operate in response to resource request signals of the CPUs to provide for selection of one CPU per CPU group.

The allocation controller includes a number of CPU buses, each CPU bus is connected between a particular CPU and the first level arbitration circuits. The controller also includes group buses. Each group bus is connected between the particular CPU and the resource copies.

The allocation controller also includes second level arbitration circuits. The second level arbitration circuits are connected between the resources and each group of first level arbitration circuits. The second level arbitration circuits operate to select a CPU of one CPU group for connection to the duplicate copy resources. Each of the second level arbitration circuits operates on a rotational basis to allocate access of the duplicate copy resources among the CPUs.

The improved allocation controller includes a clock which generates a clock signal at a predetermined frequency. Simultaneous access requests of CPUs of first and second portions of a CPU group are detected. This detection circuitry is connected to the first level arbitration circuits and produces a contention signal in response to the detection of simultaneous access requests.

A disabling circuit is connected to the detection circuit, to the first level arbitration circuit and to the clock. The disabling circuit operates in response to the contention signal and to an indication, that a CPU of said first portion of CPUs was previously granted access to the resources, to inhibit transmission of the clock signal to the first arbitration level circuits corresponding to this portion of CPUs.

An enabling circuit operates together with the disabling circuit. The enabling circuit is connected to the detection circuit, to the first level arbitration circuits and to the clock. The enabling circuit operates in response to the contention signal and to an indication, that the CPU of the first portion of CPUs was previously granted access to the resources, to transmit the clock signal to the first level arbitration circuits corresponding to the second portion of CPUs.

A BRIEF DESCRIPTION OF THE DRAWINGS

DESCRIPTION OF THE PREFERRED EMBODIMENT

U.S. Pat. Nos. 4,394,728 and 4,395,753 are hereby incorporated by reference.

Figure 2:
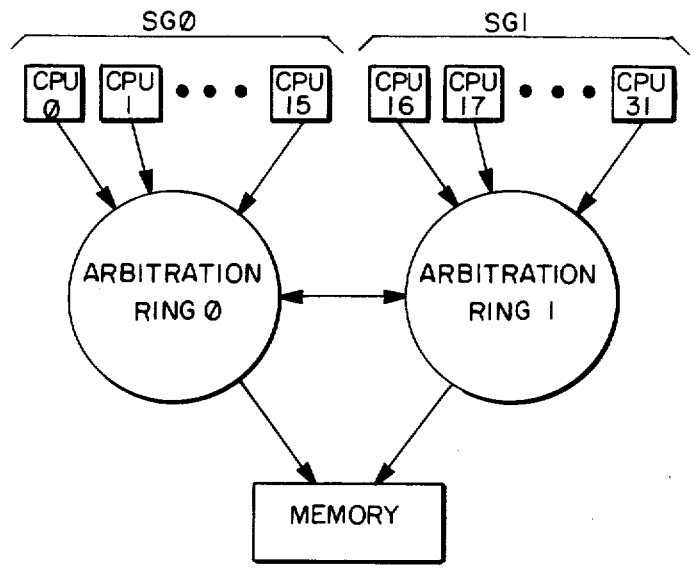
FIG. 2 is a block diagram of the arbitration concept for resolution of access contention between two subgroups of CPUs.

Referring to FIG. 2, a block diagram of an arbitration arrangement is shown. This arbitration arrangement is embodied in the U.S. patents mentioned above. Subgroup 0 (SG0) includes 16 CPUs (CPU0 through CPU15). Subgroup 1 (SG1) also includes 16 CPUs (CPU16 through CPU31). Subgroup 0 CPUs are connected to arbitration ring 0. Arbitration ring 0 is a conceptual device which represents arbitration circuitry associated with subgroup 0. This arbitration circuitry controls the granting of memory request to one of the 16 CPUs within the subgroup 0.

Similarly, CPUs 16 through CPU 31 are connected to arbitration ring 1. Arbitration ring 1 represents the circuitry which controls access to the memory by CPU 16 through CPU 31. Arbitration ring 0 and arbitration ring 1 are shown interconnected to permit resolution of CPU contention for the memory between the two subgroups.

The ring or circular structure chosen to represent arbitration rings 0 and 1 indicates that within a subgroup access to the memory is granted to simultaneously requesting CPUs on a rotational basis. That is, access is granted first CPU0, then CPU1, and so forth up to CPU 15, then access is returned back to CPU0. Similarly for subgroup 1, access to the memory is granted first to CPU 16, then to CPU 17, through CPU 31 and is returned back to CPU 16.

Figure 4:
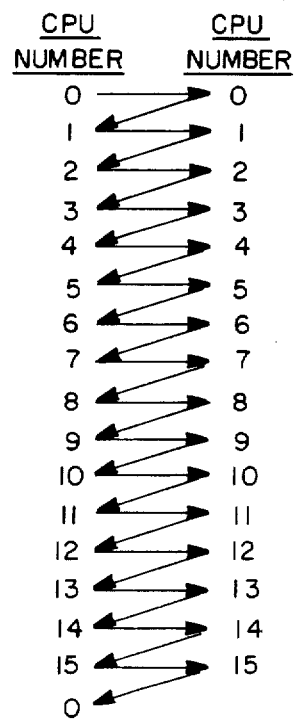
FIG. 4 is a diagram, similar to FIG. 1, depicting the resource allocation between two subgroups of CPUs when the arbitration circuitry includes the circuitry of the present invention.

While the arbitration ring concept resolves contention between simultaneously requesting CPUs within a subgroup, memory contention between two simultaneously requesting CPUs of different subgroups must be resolved between the two arbitration rings. This arbitration is conceptually straightforward. Memory access is first granted to the CPU of one or the other subgroups. Then, CPU access to the memory alternates between the two subgroups. The circuitry for accomplishing this arbitration is shown in FIG. 4 of either of the U.S. patents mentioned above and incorporated by reference. In the block diagram of FIG. 2, this arbitration is represented by the arrow connecting arbitration rings 0 and 1.

In systems which include three fully equipped groups of CPUs (each group including two subgroups), arbitration of resource (memory) contention is also resolved in a ring or rotational fashion between the three groups. Circuitry for arbitrating CPU contention for access to the common resource between groups of CPUs is shown in FIG. 5 of each of the above mentioned U.S. patents.

Figure 3:
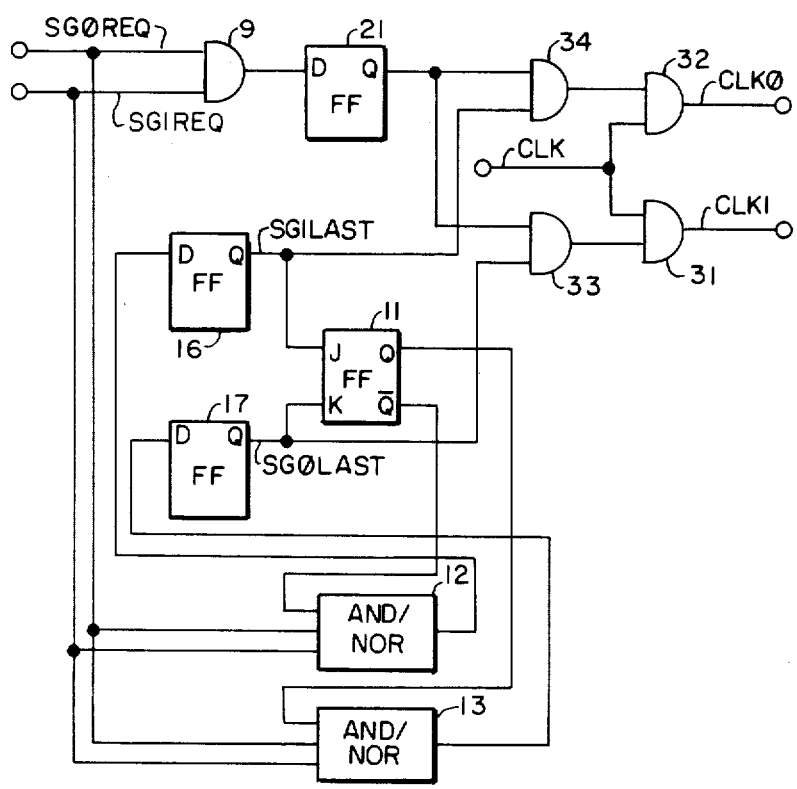
FIG. 3 is a schematic diagram of the improvements made to the arbitration circuitry embodied in the present invention.

Referring next to FIG. 3 of the above mentioned U.S. patents, the arbitration ring circuitry for each subgroup is shown. The grant signal (grant 0 through grant 15) is connected to the corresponding CPU (CPU0 through CPU 15) via the corresponding GRANT lead. The explanation of the arbitration ring circuitry and the improvements thereto will be shown for the arbitration ring of one subgroup operating in the simplex mode. The two rings operate synchronously for the duplex mode as taught in U.S. Pat. No. 4,394,728. It is to be noted that each arbitration ring has arbitration circuits connected to corresponding CPUs and that the grant signal is passed from one arbitration circuit to the next as a function of the clock (CLK) signal.

For example, on the first clock cycle, flip-flop 201 will be clocked. As a result, J-K flip-flop 204 will produce the grant signal to enable CPU0 to access the memory. The GRANT signal enables the next arbitration circuit corresponding to CPU1 to receive access to the memory upon the next clock signal via the CLK lead. This scheme of passing the grant signal continues on each clock cycle, transmitting the grant signal to each of the arbitration circuits corresponding to the CPUs, until arbitration circuit 15 is reached.

Arbitration circuit 15 includes D-type flip-flop 351 gates 352, 353, and 355, and J-K flip-flop 354. After arbitration circuit 15 has granted CPU 15 access to the common memory, the grant signal is passed back from gate 350 to gate 202. On the next clock cycle, a signal on the CLK lead enables arbitration circuit 0 to give control to CPU0, thereby completing the ring. This circular rotation of the grant signal between arbitration circuits gives rise to the name arbitration ring.

Figure 1:
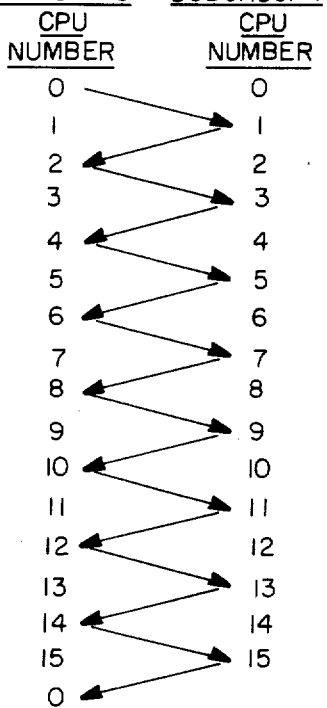
FIG. 1 is a diagram depicting resource allocation between two subgroups of CPUs under a condition of frequent common resource access by the CPUs.

Due to the clock signal advancing the grant each clock cycle, the "walking" phenomenon of FIG. 1 of this application was observed. The CLK lead connects the system clock directly to each of the flip-flops of each arbitration circuit of the respective arbitration ring. Clocking this lead causes advancement of the grant signal, such that, when it is shared between subgroups it advances in a "walking" fashion, shown in FIG. 1.

Referring to FIG. 3, the circuitry for constant CPU contention arbitration is shown. The resource request signals supplied via the SG0REQ and SG1REQ leads are the subgroup 0 request and subgroup 1 request signals, respectively. These signals are transmitted via their respective leads to AND gate 9 and to combination AND/NOR gates 12 and 13. Gate 9 is connected to the D-input of flip-flop 21. The Q output of flip-flop 21 is connected to AND gates 33 and 34. AND gate 34 is connected to AND gate 32. AND gate 33 is connected to AND gate 31. AND gate 32 produces the CLK0 signal on the corresponding lead. This signal is used to operate arbitration ring 0 logic in advancing the grant signal among subgroup 0 CPUs. Similarly, the CLK1 signal transmitted via the corresponding lead operates arbitration ring 1 logic to advance the grant signal among subgroup 1 CPUs.

The Q-bar and Q outputs of J-K flip-flop 11 are connected to AND/NOR combination gates 12 and 13, respectively. The output of combination gate 12 is connected to the D-input of D-type flip-flop 16. The output of combination gate 13 is connected to the D-input of D-type flip-flop 17. The Q output of flip-flop 17 is connected to the J-input of flip-flop 11 and to an input of AND gate 34.

The Q output of flip-flop 16 on the SG1LAST lead is a signal indicating that subgroup 1 was the last subgroup to have a CPU be given access to the common resource. The Q output of D-type flip-flop 17 is connected to the K-input of flip-flop 11 and to AND gate 33. The Q output of flip-flop 17 on the SG0LAST lead indicates that subgroup 0 was the last subgroup to have a CPU be given access to the common resource. The system clock (not shown) is connected to AND gates 31 and 32 via the CLK lead.

Referring to FIG. 3 of the above mentioned U.S. patents, the system clock is connected directly via the CLK lead to flip-flops 201, 211 . . . 351. In FIG. 3 of the present application, the circuitry is connected between the system clock via the CLK lead and the above mentioned flip-flops of FIG. 3 of the referenced U.S. patents. The action of the circuit of FIG. 3 of the present application inhibits the subgroup which was not granted access to the common resource from advancing its GRANT signal. The circuit of FIG. 3 of the present application inhibits clock pulses from advancing the D-type flip-flops 201, 211 . . . 351 of the subgroup which was not granted access to the memory.

Referring to FIG. 3 of the present application, gate 9 receives requests from each of the subgroups indicating that there is at least one CPU requiring access to the memory or common resource. Since it is assumed that a contention situation assists, both signals SG0REQ and SG1REQ will be at logic 1. As a result, gate 9 is enabled and flip-flop 21 becomes set (logic 1). The Q output of flip-flop 21 is transmitted to AND gates 33 and 34. If there is contention between the two subgroups of CPUs for the common resource, both gates 33 and 34 will have their upper input set to logic 1 due to the Q output of flip-flop 21.

J-K flip-flop 11 operates as a toggle switch to alternately pass control of access of the common resource between subgroup 0 and subgroup 1. Again, assuming that there is a contention situation, both the SG0REQ and SG1REQ signals are at logic 1. Since flip-flop 11 is either in the set or reset state, the values of the outputs Q and Q-bar of flip-flop 11 will be either logic 0 and logic 1, respectively or logic 1 and logic 0, respectively. If it is assumed that subgroup 0 was granted access to the common resource last, the Q output of flip-flop 11 will be set and the Q-bar output will be reset. As a result, combination gate 12 produces a logic 1 output which is transmitted to flip-flop 16 where it is latched and stored. The Q output of flip-flop 16 is now at logic 1.

Since subgroup 0 was the last to be given accessed to the common resource, subgroup 1 should be granted access this time according to the scheme. The Q output of flip-flop 16, which is at logic 1, is transmitted to gate 34. Gate 34 is operated and causes gate 32 to operate upon the next clock signal on the CLK lead. This clock signal is transmitted to subgroup 0 via the CLK0 lead. This signal will operate each of the flip-flops mentioned in FIG. 3 of the referenced U.S. patents to advance the take grant signal among the CPUs as mentioned above.

Since the Q-bar output of flip-flop 11 is reset, combination gate 13 will produce a logic 0 at its output. As a result, flip-flop 17 will latch and store a logic 0. Therefore the Q output of flip-flop 17 will be at logic 0. As a result, gate 33 will be inhibited from operation. On the next clock cycle, the clock signal on the CLK lead will not be transmitted through gate 31 to the subgroup 1 flip-flops shown in FIG. 3 of the referenced U.S. patents. As a result, these flip-flops will not advance the grant signal. The next CPU to be given control in subgroup 1 will be the same as the last one given control in the subgroup 0.

As a result of the operation of the circuit of FIG. 3, the granting of CPU access to the common resource will be that as shown in FIG. 4. It is to be noted that in FIG. 4 no CPUs in either group are denied access, if each of the CPUs is requesting continual access to the common resource or memory. Therefore, each of the 16 CPUs of each subgroup is able to have its local memory reloaded very rapidly without ignoring the requests of any of the CPUs. It should be noted that for the non-contention case or for the case in which every CPU is not requesting access, the circuit of FIG. 3 still permits proper arbitration between the subgroups.

Lastly, on the next arbitration contention situation, flip-flop 11 has been toggled. Since a CPU of subgroup 1 was granted memory access during the last contention situation, the circuitry of FIG. 3 operates to grant access to a CPU of subgroup 0, etc.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A subgroup access controller used in combination with an allocation controller, said subgroup access controller providing sharing of multiple duplicate copy resources by pluralities of CPUs, said allocation controller including said plurality of CPUs including first, second and third groups each group including first and second portions; at least three resources each having two duplicate copies, each to be selectively connected to any CPU of said plurality; first arbitration means including first, second and third duplicated groups, each duplicated group of first arbitration means connected to a corresponding group of CPUs; said first arbitration means operated in response to resource request signals from said plurality of CPUs to provide for selection of one CPU per CPU group; a plurality of CPU buses including first, second and third groups corresponding to said CPU groups, each bus connected between a particular CPU and said first arbitration means, each CPU bus including a control portion and an address/data portion; at least three pair of group buses, each bus pair corresponding to one said CPU group and said corresponding CPU buses, and each group bus connected between a particular CPU through said corresponding CPU bus via said first arbitration means and connected to one copy of said duplicate copy resources via one said group bus, each group bus further connected to said other group buses of said corresponding groups; one group bus of each said pair further connected to a first copy of said duplicate copy resources and another group bus of each said pair further connected to a second copy of said duplicate copy resources; second arbitration means connected between each of said duplicate copy resources and each group of first arbitration means and said second arbitration means operated in response to said operation of said first arbitration means to select one of said requesting CPUs of said different CPU groups for connection to said first and said second copies of one selected duplicate copy resource via one said pair of group buses and said corresponding CPU buses; said group bus pair connected to said requesting CPU via said corresponding CPU bus through said first arbitration means and said second arbitration means and connected to said duplicate copy resources to establish bus connection between said one selected CPU and said selected duplicate copy resources for the transmission of data to and from said resources; each of said second arbitration circuits operated on a rotational basis to allocate access of said selected duplicate copy resources to said requesting CPU; and clock means for generating a clock signal of a predetermined frequency, said subgroup access controller comprising:

means for detecting simultaneous access requests of a CPU of each of said first and second portions of said CPU groups, said means for detecting connected to said first arbitration means and being operated in response to said simultaneous access requests to produce a contention signal;

means for disabling connected to said means for detecting, to said first arbitration means and to said clock means, said means for disabling being operated in response to said contention signal and to an indication that a CPU of said first portion of said group was previously granted access to said resources to inhibit transmission of said clock signal to said first arbitration means corresponding to said first portion of CPUs; and means for enabling connected to said means for detecting, to said first arbitration means and to said clock means, said means for enabling being operated in response to said contention signal and to indication that a CPU of said first portion of said group was previously granted access to said resources to transmit said clock signal to said first arbitration means corresponding to said second portion of CPUs.

2. The subgroup access controller as claimed in claim 1, wherein there is further included first gating means connected to said first arbitration means corresponding to said first and to said second portions of CPUs, said first gating means being operated in response to said simultaneous access requests to produce last granted access signals, indicating the identity of which CPU portion was previously granted access to the resources.

3. The subgroup access controller as claimed in claim 2, wherein there is further included memory means connected to said first gating means, to said means for disabling and to said means for enabling, said memory means being operated to store values representing said last granted access signals.

4. The subgroup access controller as claimed in claim 3, wherein there is further included switching means connected to said memory means and to said first gating means, said switching means being operated to reverse the values of said last granted access signals between said first and second portions of CPUs.

5. The subgroup access controller as claimed in claim 1, said means for detecting including:
   second gating means connected to said first arbitration means of said first portion and of said second portion of CPUs; and
   latching means connected to said second gating means and being operated to store said contention signal.

6. The subgroup access controller as claimed in claim 5, said means for disabling including:
   third gating means connected to said latching means and to said memory means; and
   fourth gating means connected to said third gating means, to said clock means and to said first arbitration means corresponding to said first portion of CPUs.

7. The subgroup access controller as claimed in claim 6, said means for enabling including:
   fifth gating means connected to said latching means and to said memory means; and
   sixth gating means connected to said fifth gating means, to said clock means and to said first arbitration means corresponding to said second portion of CPUs.

8. The subgroup access controller as claimed in claim 7, said first gating means including:
   first combination gating means connected to said first arbitration means of said first and second portions of CPUs, to said memory means and to said switching means; and
   second combination gating means connected to said first arbitration means of said first and second portions of CPUs, to said memory means and to said switching means.

9. The subgroup access controller as claimed in claim 8, said first and second combination gating means each including AND/NOR combination gating means.

10. The subgroup access controller as claimed in claim 9, said memory means including:
    first storage means connected to said first combination gating means, to said switching means, to said means for enabling and to said means for disabling; and
    second storage means connected to said second combination gating means, to said switching means, to said means for enabling and to said means for disabling.

11. The subgroup access controller as claimed in claim 10, said first and second storing means each including D-type flip-flop means.

12. The subgroup access controller as claimed in claim 11, said switching means including J-K flip-flop means connected to said first and second storage means and to said first and second combination gating means.

13. The subgroup access controller as claimed in claim 12, said latching means including D-type flip-flop means.

14. The subgroup access controller as claimed in claim 13, said second gating means including AND gating means.

15. The subgroup access controller as claimed in claim 14, said third gating means including AND gating means.

16. The subgroup access controller as claimed in claim 15, said fourth gating means including AND gating means.

17. The subgroup access controller as claimed in claim 16, said fifth gating means including AND gating means.

18. The subgroup access controller as claimed in claim 17, said sixth gating means including AND gating means.

* * * * *